(No Model.)  
3 Sheets—Sheet 2.
W. I. DONSHEA.
CONTROLLING ELECTROMAGNETIC MACHINES.
No. 531,365.　　　　　　　　Patented Dec. 25, 1894.
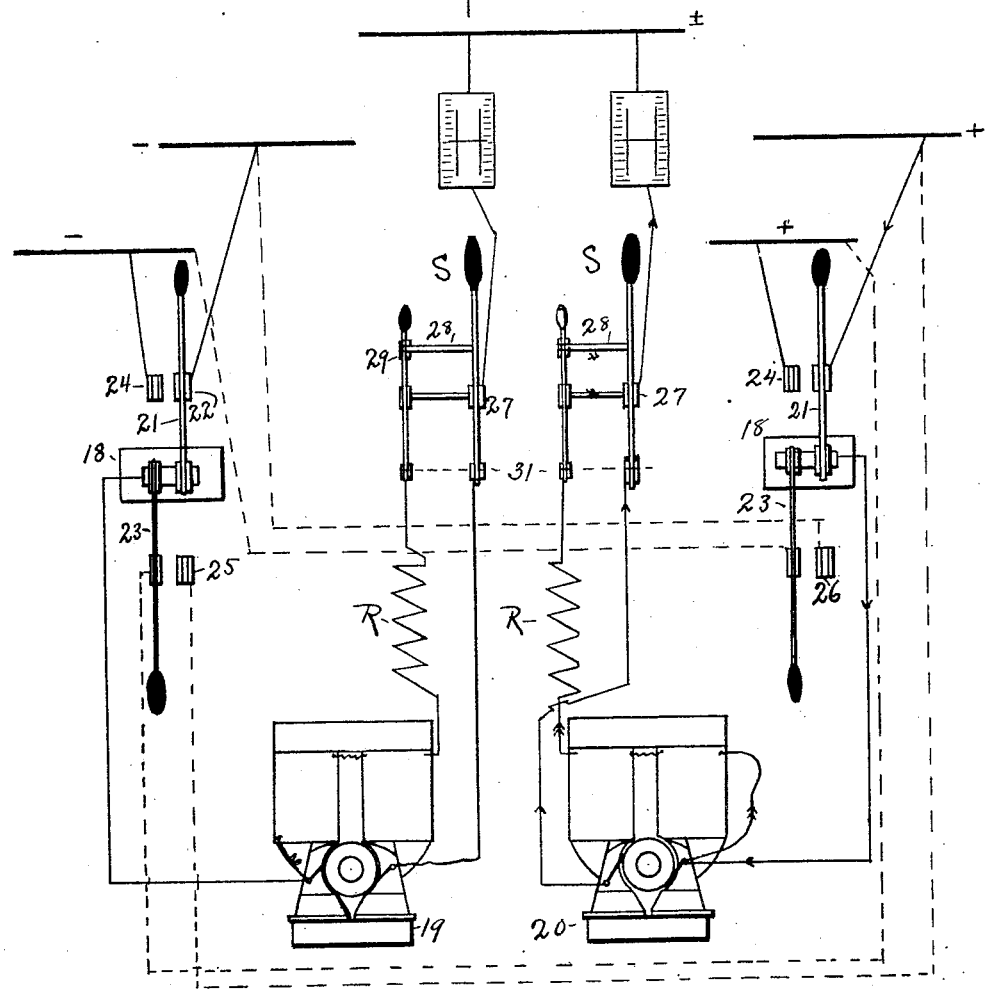
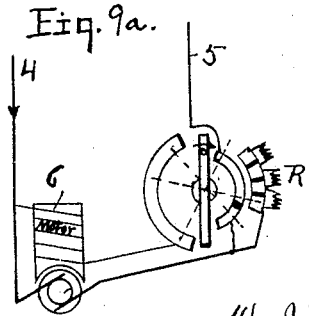

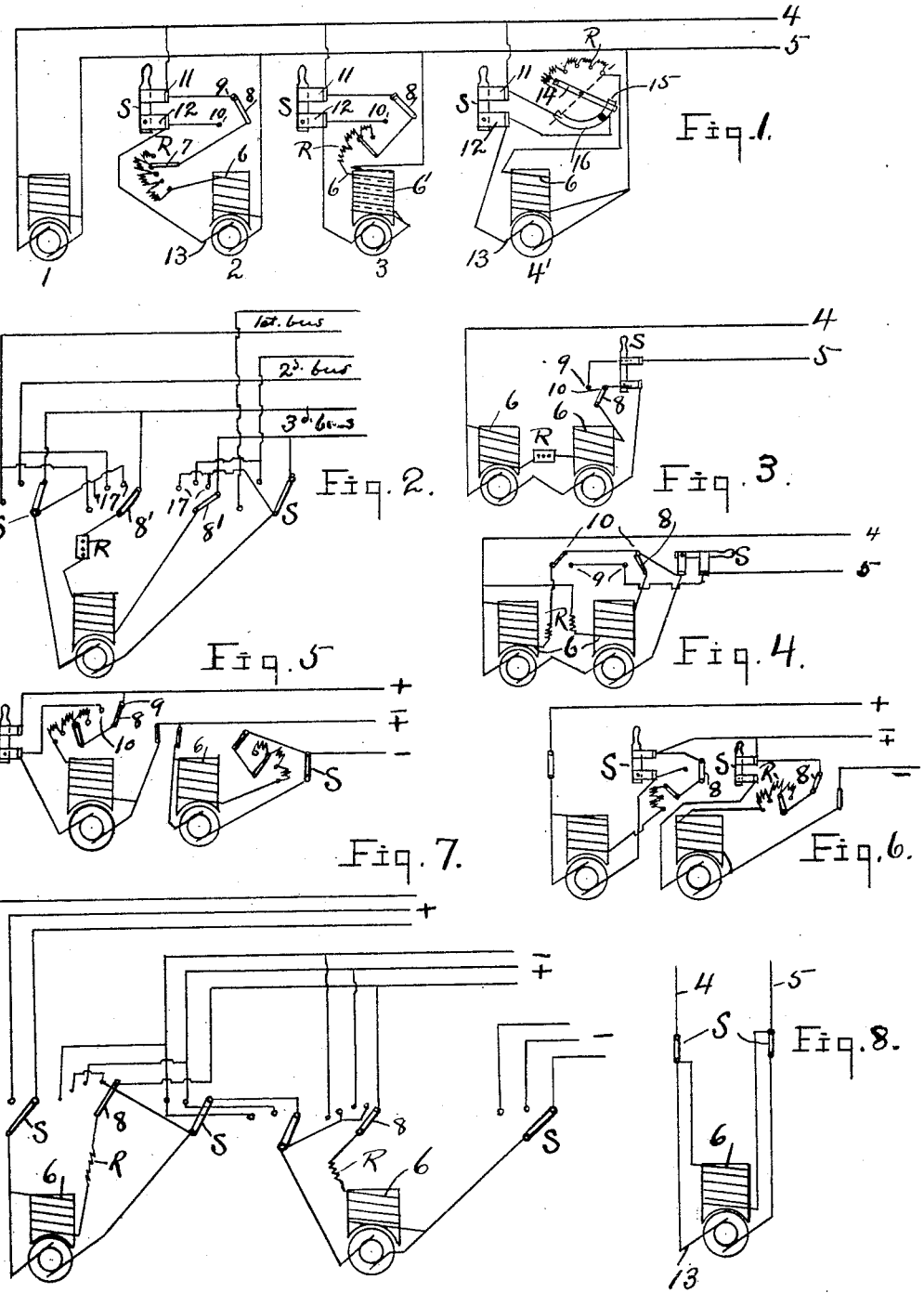

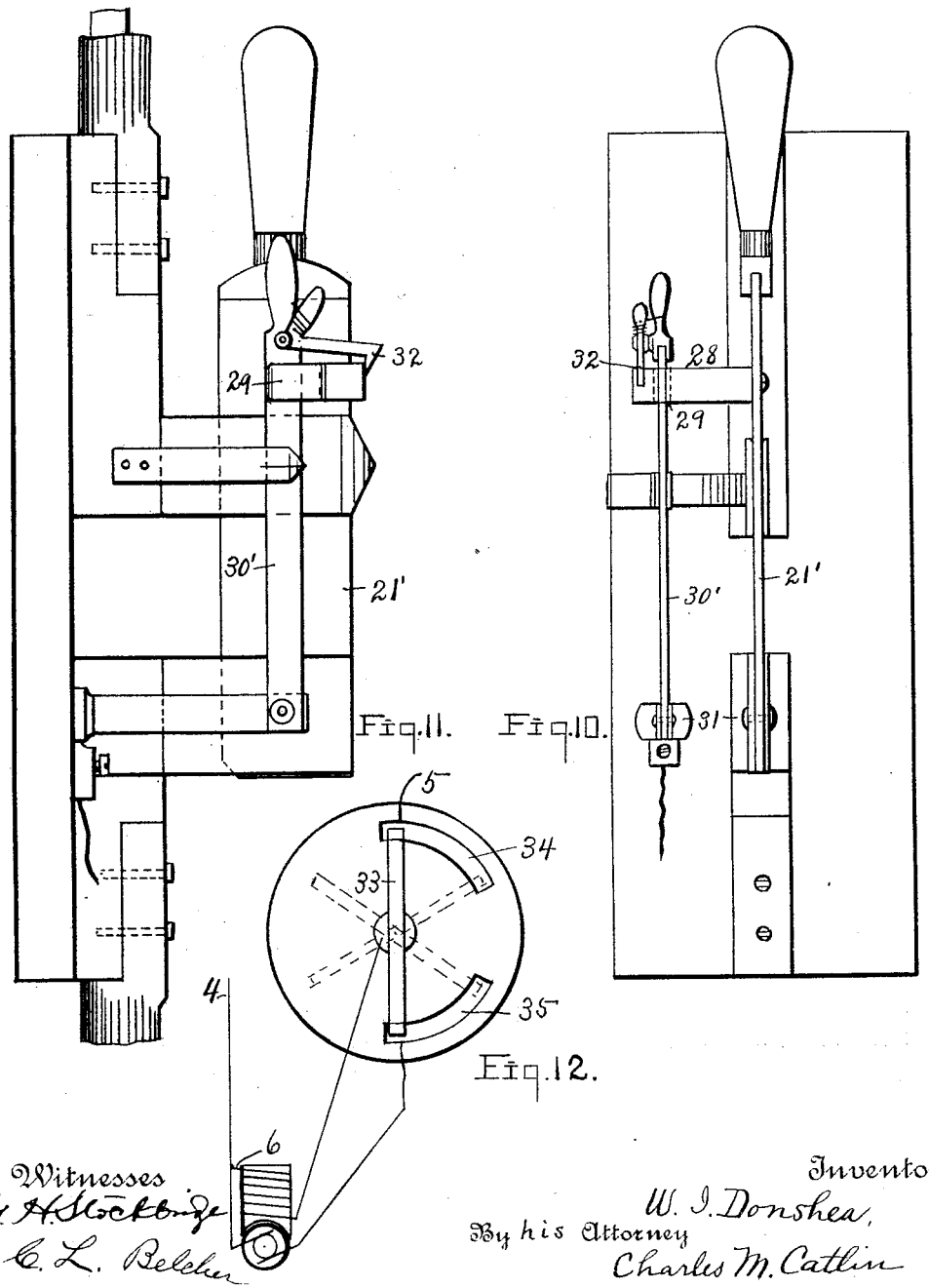

UNITED STATES PATENT OFFICE.

WILLIAM I. DONSHEA, OF NEW YORK, N. Y.

CONTROLLING ELECTROMAGNETIC MACHINES.

SPECIFICATION forming part of Letters Patent No. 531,365, dated December 25, 1894.

Application filed January 29, 1894. Serial No. 498,335. (No model.)

*To all whom it may concern:*

Be it known that I, WILLIAM I. DONSHEA, a citizen of the United States, and a resident of New York, county and State of New York, have invented certain new and useful Improvements in Controlling Electromagnetic Machines, of which the following is a specification.

The present invention relates to a method of, and apparatus for controlling electro-magnetic machines.

The main object of the invention is to control the fields of such machines so that they can be quickly made, and so unmade as not to cause sparking at any switch connected in the field circuit, or to cause any injury to the field coils by a sudden rise in electro-motive force caused by the field discharge.

The invention consists in the method and apparatus hereinafter described and fet forth in the claims.

There are two common methods of exciting the field magnets of an electro-magnetic machine having shunt wound magnets; the first being the exciting of the magnets by current from the machine itself having the magnets; and the second being, the exciting of the magnets in whole or in part from a source of electricity other than that of the machine itself. The first case is called "self exciting;" the second case is called "separately exciting" or "bus exciting." Strictly speaking, when two or more electro-magnetic machines deliver current to, or take current from, a common set of conductors or bus wires, the machines are not wholly self-exciting as long as they are so connected together, as a machine can only self excite its field when disconnected from an outside source of electricity. The first method, while desirable for some reasons, is open to the objection that it builds up or creates the field slowly when the machine is starting, and because of the possibility that the field will build up reversed. The second method is somewhat objectionable, on account of the expense and complexity of operating separate exciting generators and because of the danger of throwing one or more dynamos out of operating condition, by the breaking down or injuring of the exciting generator. "Bus exciting" is objectionable also because the field remains on when the machine is shut down and in discharging the field by breaking the circuit there is danger of injuring the field coils or the armature by the discharge piercing the insulation of either.

By my invention all these and certain other objections are overcome. This is accomplished by exciting the field coils in the first instance, wholly or partially, by a current derived from the bus wires, or from some other source of current exterior to the machine having such field coils, and before closing the armature circuit, maintaining the field during the use of the machine by such current, and when about to throw the machine out of use, converting it into a self-exciting machine by a mere change in the circuit connections, and without first discharging the field. When this is done the machine is allowed to slow down gradually. The magnetization of the field magnets will likewise gradually disappear, no damage will result to the field coils, and no sparking will be caused by any switch in the field circuit, as might have been the case had the circuit been opened directly between the bus wires or the exterior supply and the field coil.

In the accompanying drawings, the invention is illustrated as applied to several different systems or modes of connecting up the machines to be controlled.

Figures 1 to 9 are diagrams of several systems. Fig. 9ª illustrates my invention applied to a moter. Figs. 10 and 11 are plan and side views of a switch, which may be used in the system shown in Fig. 9; and Fig. 12 shows a single switch which may be employed in carrying out the invention in certain cases.

As above indicated the main feature of this invention is the mode of controlling the fields of dynamos and motors, by exciting them from or by one or more external sources of current during use, and before connecting the armature in circuit and then converting them into self-exciting machines before or during the act of disconnecting them from the system, and also separately or bus exciting in the first instance when throwing the machines into use. So long as this is accomplished the particular means employed to effect the necessary changes of circuit connections in any particular system, or the character of the system itself, is unimportant; and while the invention is shown applied to several common systems, it is not to be understood that all systems properly coming within the scope of the invention are shown.

Referring first to Fig. 1, four machines 1, 2, 3, and 4' are shown connected to the circuit or bus wires 4, 5. Machine 1 is a dynamo or other source of electric current, and the others are either dynamos or motors, or part dynamos and part motors. S are main switches for throwing the machines into and out of connection with or from the circuit. R are regulating resistances in the shunt branches. The field magnet of machine 2 has a simple shunt winding 6, connected through R to a resistance switch 7, thence to switch 8 adapted to rest on contact 9, connected to clip 11, and thence to wire 4, or on contact 10, connected to clip 12, and to the upper commutator brush 13. The other end of shunt coil is connected to the lower commutator brush. The connections at machine 3 are the same as above described except that the field magnet is compound wound, that is, it has a series coil 6', in addition to the shunt coil 6. At machine 4 the connection is similar to that at 2 except that a single switch is used instead of two switches 7, 8. The switch arm 14 is adapted to move over the resistance contacts, and also over contacts 15, 16, which are insulated from each other, the former being connected to clip 12, and the latter to clip 11. In throwing the machine 2 or 3 out of circuit, its switch 8 is moved to contact 10, and then the main switch S is opened. This leaves the field coil connected to the armature, making a wholly self-exciting machine, in which the field will gradually disappear. When throwing the machine into use, switch 8 is moved to contact 9, thereby bus exciting the field, after which switch S can be closed as soon as desired. At machine 4' the switch arm 14 is in the position occupied by it when all the resistance is in the circuit, and in condition for the opening of switch S. When the machine is running normally switch arm 14 rests on contact 16 as indicated by the dotted line, and can be moved to throw in more or less resistance. It is unnecessary that all of the resistance should be in when switch S is opened.

Fig. 2 shows a multiple bus system with switches S, S, by which the machine can be thrown onto any of the buses, and field switches S', by which the field coil can be correspondingly connected. In this case the machine is self-exciting when the switches S' are on the contacts 17, and the switches S, S, are open.

Fig. 3 shows several machines in series. When switch 8 is in the position shown and switch S is open the machine is self-exciting.

Fig. 4 shows a system in which the field coils of several machines are in multiple arc between the buses 4, 5. With switches 8 in the position shown and S open the machines are self-exciting. When switches 8 are on contacts 9, the machine is bus excited.

Figs. 5 and 6 show three wire systems supposed to be connected to a suitable source of supply, (not shown,) and having connections and switches adapted to be operated as above described. In the first system the field switches are shown in connection with the positive and negative buses, and main switches; while in the second system the field switches are shown in connection with the neutral bus, and main switches.

Fig. 7 shows a multiple bus three wire system. The switches and connections are similar to those already described, and need not be set forth in detail.

Fig. 8 shows a shunt machine connected to the buses 4, 5, with a switch S on each side. The shunt coil 6 is connected to the lower terminal of the left switch, and to the upper terminal of the switch at the right. To throw the dynamos out of circuit open the left switch. The machine is then self-exciting. To throw the machine into circuit first open the right switch, then close the left switch, thus bus exciting the field, then close the right switch.

Fig. 9 shows another three wire system, with improved switching devices and additional circuit connections. This system has two or more positive and negative buses, and differs from the system of Fig. 7 in having only one neutral bus. It has, also, switches, 18, whereby the machines 19, 20, can be connected to either of the positive and negative buses, at will. This is accomplished by removing switch 21 from clips 22, and swinging switch arms 23 into clips 24. 25, 26 are clips in position to engage switch arms 21 when they are removed from clips 22 and are swung down to their lowest position. Clip 25, on the negative side is connected to the positive bus, and clip 26, on the positive side is connected to the negative bus. Thus by a simple movement of arms 21, the machines can be cross connected in the system, simultaneously reversing the current in the field coils. The pivots of switches 18 are connected to commutator brushes of the machines. The other brush of each machine is connected to a main dynamo switch S, which when in the position shown, connects said brushes with the clips 27, and with the neutral bus. Each switch S has an arm 28 projecting to one side, and carrying a spring clip 29, which is adapted to engage the blade of switch 30' when both switches occupy the position shown. The preferred form of these switches is shown in Figs. 10 and 11. The switch arms 21', 30' have pivots 31 in line with each other. Arm 30' has a hook 32 adapted to engage the arm 28 and moved forward by a spring to lock arms 21', 30' together, whereby when the former is pulled down to break the circuit, between the neutral bus and the dynamo, the latter (30') is simultaneously raised, thereby disconnecting it from the neutral bus, but maintaining its connection with switch arm 30', and maintaining or establishing a closed circuit through the field coils from the commutator brushes, and independent of the buses, so that, as above indicated, the field magnets will discharge gradually and with safety. Other means for locking arms 21', 30', may be substituted for those shown.

Fig. 12 shows a form of switch which may be used in connection with a machine connected to a two wire circuit. The centrally pivoted arm 33 is adapted to make contact with both contact plates 34, 35, at the same time, as shown in full lines, or with either plate separately, as shown in dotted lines. When arm 33 is in the position shown the machine is connected to the buses. When moved in the direction of the arrow to the first dotted position the machine is self-exciting, and when moved in the same direction to the second dotted position, the dynamo is about to be thrown into circuit for use. This switch can be used also in three wire or other systems.

In Fig. 9ª, the switch is shown in position to open the shunt coil 6. When the switch is turned to the right to the position of the first dotted line, the circuit is closed through the field coil 6 only. As the arm is turned still further the armature circuit is closed, and as the arm is further advanced the resistance is cut out of the motor circuit, and finally wire 5 is disconnected and the motor is left in condition to self-excite its field. It is important that the field coil should be in circuit an appreciable time before the armature is thrown into circuit. Otherwise the coils are frequently damaged. This is particularly important, however, in connection with dynamos in electric lighting systems.

I claim—

1. The method of controlling electro-magnectic machines, which consists in exciting the field coil of such machine by connecting it to a source of current exterior to the machine itself, when throwing the machine into use, and before closing the armature circuit and converting it into a self-exciting machine before or while throwing it out of use whereby field discharge is accomplished gradually, substantially as described.

2. The method of controlling electro-magnetic machines which consists in quickly establishing a field by a current from a source exterior to the machine itself, and before closing the armature circuit when starting, and maintaining during use the connection of such exterior source, and finally converting the machine into a self-exciting machine, substantially as described.

3. The method of controlling dynamos having shunt coils which consists in maintaining the machine connected to an exterior circuit and source of current during use, and before closing the armature circuit and when throwing the same out of circuit breaking the connection between the external circuit and source and the machine, but maintaining the shunt circuit of the machine intact until the field is gradually reduced, substantially as described.

4. The method of connecting electro magnetic machines having shunt field coils to the multiple buses of a divided source system which consists in connecting the shunt coils in circuit with said buses, and connecting each armature of the divided group of machines to said buses after its field coil is connected.

5. The method of controlling electro magnetic machines having shunt field coils to the multiple buses of a divided source system which consists in connecting the shunt coils in circuit with said buses, connecting each armature of the divided group of machines to said buses after its field coil is connected, and disconnecting the machines from the buses leaving the shunt field coils connected in circuit with their armatures.

6. The combination of an electro-magnetic machine having suitable field coils, and armature, means adapted to connect the field coils to a source of current exterior to the machine and then to close the armature circuit, and switching devices for connecting the field coils to the armature of the machine itself, to form a self exciting machine, substantially as described.

7. The combination of an electro-magnetic machine having suitable field coils and armature, bus wires, means for connecting said coils thereto before closing the armature circuit, and for breaking such connection, and means for connecting the field coils to the armature of the machine itself, to form a self exciting machine, substantially as described.

8. The combination of two buses connected to a source of current, a shunt machine adapted to be connected to said buses, a switch in each bus, one between the connection of the shunt coil and the commutator of the machine, and the other switch outside the connection of the opposite end of the shunt coil, substantially as described.

9. The combination of dynamos, connected to positive, negative, and neutral conductors, switching devices for connecting the field coils between the negative and positive and the neutral conductors, and switches adapted to cross connect the dynamos, substantially as described.

10. The combination of positive, negative and neutral buses, electro-magnetic machines connected or adapted to be connected thereto, switches 18 between the machines and buses, and switch contacts 25, 26 connected from the negative to the positive and from the positive to the negative sides, respectively, substantially as described.

11. The combination of two or more buses, electro-magnetic machines, switch contacts 22, 24, and means for connecting the machines to either set of said contacts, substantially as described.

12. The combination of parallel pivoted switch blades, each blade having separate contacts, an arm projecting from one blade, and means for connecting said arm to the other blade, as and for the purpose set forth.

13. The combination of parallel switch blades, each blade having separate contacts, an arm projecting from one blade, a catch carried by the other blade and adapted to engage said arm.

14. The combination of two switches movable both separately and together, one terminal of each of which is connected to a separate circuit from the other, and means for connecting and disconnecting said switches, substantially as described.

15. The combination with an electro-magnetic machine having a suitable armature circuit, and a shunt field coil, of a switch having contacts 34, 35, connected or adapted to be connected to the machine and to a bus, a switch arm 33, to which the shunt coil is or may be connected, adapted to connect them, and adapted also by movement in one direction to break contact with one and then with the other of said contacts, substantially as described.

16. The combination, in a switch, of a switch arm to which one circuit wire can be connected, and contacts in position to make simultaneous contact with said arm when it is in one position, and said contacts being placed so that the arm will break contact therewith successively as the switch arm is moved forward, substantially as described.

In testimony that I claim the foregoing as my invention I have signed my name, in presence of two witnesses, this 27th day of January, 1894.

WILLIAM I. DONSHEA.

Witnesses:
HARRISON J. SMITH,
JOHN VAN VLEET.